(12) United States Patent
Pedrini et al.

(10) Patent No.: US 6,929,163 B1
(45) Date of Patent: Aug. 16, 2005

(54) UNIVERSAL MOUNTING BRACKET FOR A VEHICLE-MOUNTED EQUIPMENT CARRIER

(75) Inventors: Fabio Pedrini, Bologna (IT); Mark A. Dahl, Rice Lake, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 10/271,075

(22) Filed: Oct. 15, 2002

(51) Int. Cl.[7] .................................................. B60R 9/10
(52) U.S. Cl. ...................... 224/506; 224/507; 224/519; 224/521; 224/924
(58) Field of Search .................. 224/924, 519, 224/521, 502, 506, 507, 488, 489, 495, 524, 224/282, 548, 553, 505; 414/462; 211/23, 211/24; 403/83, 84, 104, 106, 108, 113, 117; 248/185.1, 222.52, 291.1

(56) References Cited

U.S. PATENT DOCUMENTS

| | | |
|---|---|---|
| 995,771 A | 6/1911 | Coyle |
| 1,135,517 A | 4/1915 | Goss |
| 1,860,920 A | 5/1932 | Barker |
| 1,886,911 A | 11/1932 | Schulman |
| 1,912,958 A | 1/1933 | Widener |
| 1,979,809 A | 11/1934 | Newton |
| 2,512,267 A | 6/1950 | Donnelley |
| 3,202,332 A | 8/1965 | Walker |
| 3,350,065 A | 10/1967 | Mankey |
| 3,529,737 A | 9/1970 | Daugherty |
| 4,976,386 A | 12/1990 | Geiger |
| 5,094,373 A | 3/1992 | Lovci |
| 5,114,120 A | 5/1992 | Bartelt et al. |
| 5,190,195 A | 3/1993 | Fullhart et al. |
| 5,303,857 A | 4/1994 | Hewson |
| 5,330,084 A * | 7/1994 | Peters .................... 224/506 |
| 5,454,496 A | 10/1995 | Sumida et al. |
| 5,518,159 A | 5/1996 | DeGuevara |
| 5,586,702 A | 12/1996 | Sadler |
| 5,626,059 A | 5/1997 | Bobbitt, III et al. |
| 5,664,717 A | 9/1997 | Joder |
| 5,752,636 A * | 5/1998 | Manley .................... 224/519 |
| 5,775,555 A | 7/1998 | Bloemer et al. |
| 5,775,560 A * | 7/1998 | Zahn et al. ............... 224/519 |
| 5,803,330 A * | 9/1998 | Stack et al. .............. 224/519 |

(Continued)

OTHER PUBLICATIONS

"Quik Hitch #T-QH4000: Multi-Fit 2 & 4 Bike Trailer Hitch Systems" brochure, Bard Wyers Sports, Inc., date unknown.

(Continued)

*Primary Examiner*—Nathan J. Newhouse
(74) *Attorney, Agent, or Firm*—Boyle, Fredrickson, Newholm, Stein & Gratz, S.C.

(57) ABSTRACT

A universal mounting bracket for a bicycle rack includes a pair of upstanding members extending from opposite sides of a base member. Each upstanding member includes aligned pivot openings through which a pivot pin is positioned to pivotally secure an equipment carrier support member between the upstanding members. The upstanding members also each include two sets of auxiliary openings spaced from the pivot openings and from one another. Depending upon the particular configuration of the support member, each pair of aligned auxiliary openings can be utilized to lock the support member in a transport position, or to stop or maintain the support member in a non-use position.

28 Claims, 3 Drawing Sheets

U.S. PATENT DOCUMENTS

| | | | |
|---|---|---|---|
| 5,884,826 A | | 3/1999 | Shaver |
| 6,062,451 A | | 5/2000 | Lassanske et al. |
| 6,089,430 A | * | 7/2000 | Mehls .................. 224/924 |
| 6,390,343 B1 | * | 5/2002 | Jain .................. 224/924 |
| 6,401,999 B1 | * | 6/2002 | Hehr .................. 224/502 |

OTHER PUBLICATIONS

"T-REX Raks Easy to Use Built To Last", advertisement, date unknown.

Slider Corp. Product Guide 1994, Slider Corp.

Swagman, advertisement, Danik Industries, Ltd., British Columbia, Canada, date unknown.

1995 Rhode Gear catalog, 1994 Rhode Gear.

"Piper Bike Racks Unsurpassed Stability", advertisement, King Roof, Inc., Taiwan, date unknown.

Rak N Loc, "Keep Your Bikes Absolutely Safe", advertisement, B&S Enterprises, date unknown.

* cited by examiner

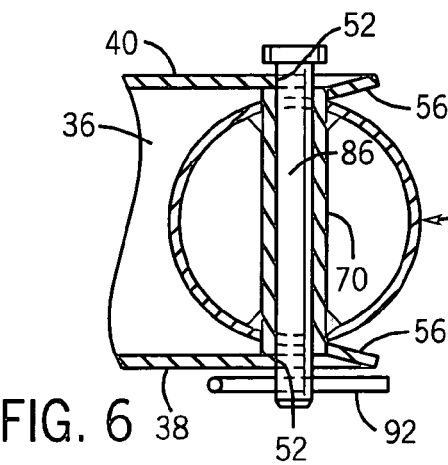
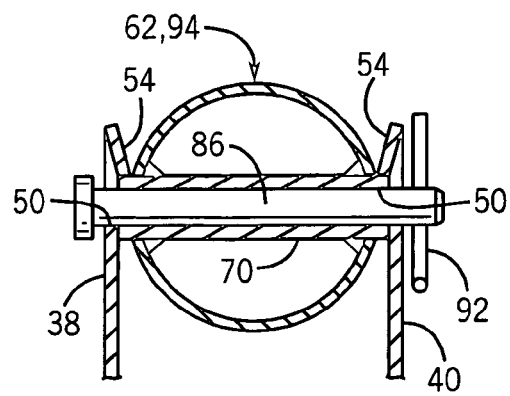
FIG. 6   FIG. 7
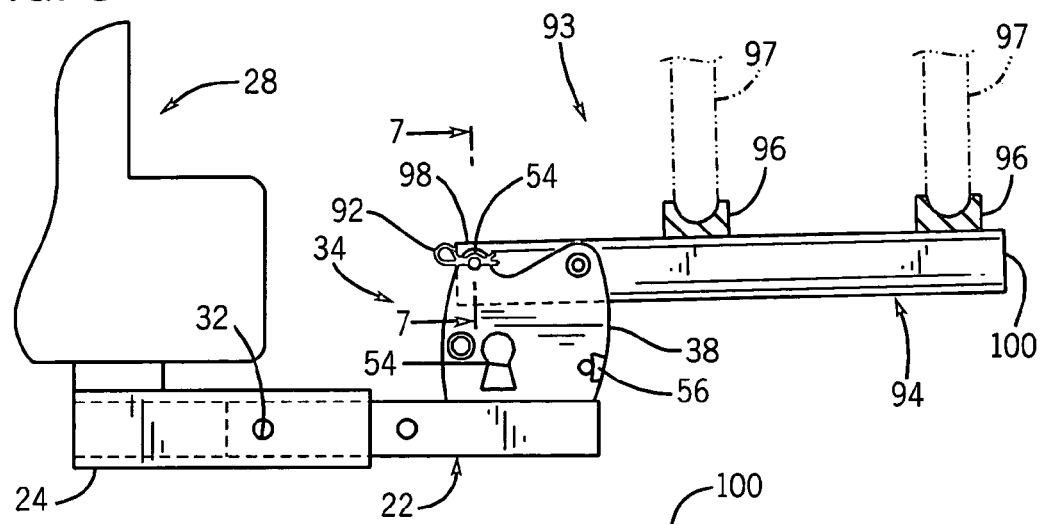
FIG. 8
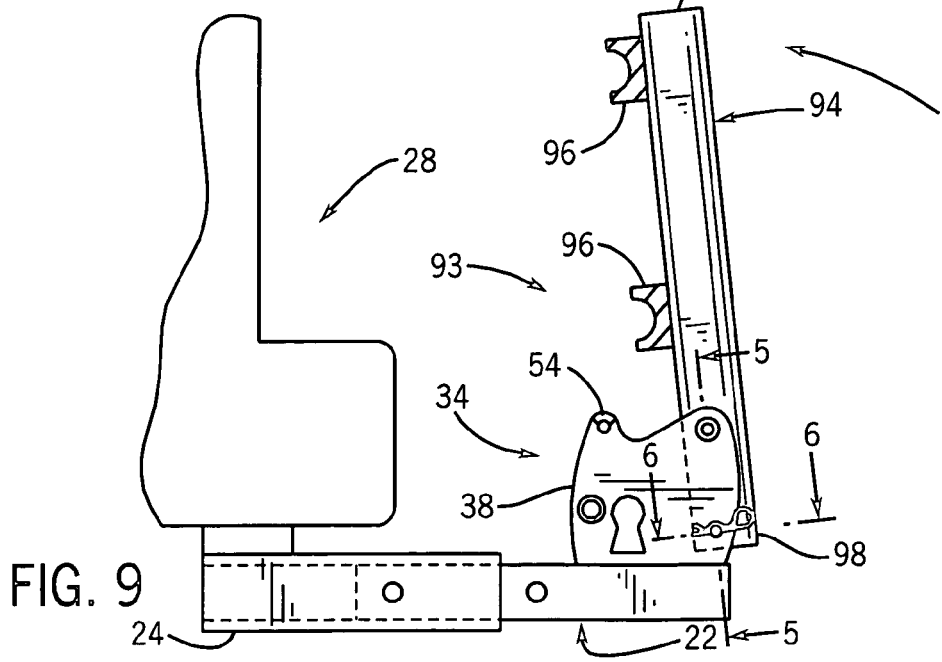
FIG. 9

UNIVERSAL MOUNTING BRACKET FOR A VEHICLE-MOUNTED EQUIPMENT CARRIER

FIELD OF THE INVENTION

The present invention relates to a vehicle-mounted equipment carrier such as a bicycle carrier or rack, and more specifically to a mounting bracket for use in mounting a carrier or rack to a vehicle.

BACKGROUND OF THE INVENTION

Hitch mounted equipment carriers, such as bicycle carriers or racks, are often utilized to secure equipment such as one or more bicycles to a vehicle to transport the bicycles from one location to another. Such racks generally include a hitch-mounting stem or hitch-mounting member such as a bar or tube that is releasably attachable to a trailer hitch receiver located on the rear of a vehicle. The hitch-mounting member supports a bracket to which is attached a support member that extends from the bracket. In some racks the support member is an upwardly extending tube that includes a rearwardly extending section at its upper end, which is provided with frame engagement structure for supporting bicycles in a suspended manner. In other racks the support member is a rearwardly extending horizontal member having wheel or fork engagement structure for supporting bicycles from below.

In either rack configuration, the bracket allows the support member to be pivoted or moved relative to the hitch-mounting member, such that the rack and the support member can be moved from a use or operative position to a non-use or inoperative position. For a support member in the form of an upwardly extending tube, the tube is adapted to be pivoted from an upstanding operative position to a rearwardly angled non-use position, which allows access to the rear tailgate or trunk area of the vehicle. For a rearwardly extending horizontal support member, the support member is pivoted from a horizontal operative position to an upstanding non-use position.

Based on the very different manners of pivoting movement between the operative and non-use portions for bicycles racks incorporating an upstanding support member and a horizontal support member, and the particular configuration of the individual support members, the brackets utilized to secure each of these support members to the hitch-mounting members have previously been specially designed to accommodate the configuration of the particular support member and its manner of pivoting movement between its operative and non-use positions. Therefore, it has been necessary for a manufacturer to produce a separate bracket for each type of rack. Further, in order for a user to change from a bicycle rack with a horizontal supporting member to a rack with an upright supporting member, or vice versa, it has been necessary for the user to purchase one of each type of rack.

As a result, it is desirable to develop a universal mounting bracket that can be fixed to a hitch-mounting member and utilized to movably secure a rack having either a horizontal support member or an upright support member to the hitch-mounting member, in order to provide manufacturing efficiencies and to allow the bicycle rack to be converted from one type to another without having to change the bracket and the hitch-mounting member.

SUMMARY OF THE INVENTION

It is an object of the present invention to provide a universal mounting bracket for an equipment carrier such as a bicycle rack, that is capable of mounting both upright and horizontal support members to a hitch-mounting hitch-mounting member of the rack, and which is capable of providing movement of the rack between operative and non-use positions.

It is another object of the present invention to provide a universal mounting bracket including a releasable securing mechanism capable of selectively locking the upright or horizontal support member in either of its positions.

It is still another object of the present invention to provide such a universal mounting bracket including stop structure that is capable of limiting pivoting movement of either an upright support member or a horizontal support member between operative and non-use positions.

It is still a further object of the invention to provide such a universal mounting bracket which can be utilized in original manufacture, and which can also be retrofitted on existing bicycle racks utilizing either upright or horizontal support members.

It is still another object of the present invention to provide such a universal mounting bracket that has a relatively simple construction and which can be inexpensively manufactured, yet which is capable of providing easy and effective movable mounting of either type of support member to the hitch-mounting member.

Yet another object of the invention is to provide a method of mounting an equipment carrier having either an upright or a horizontal support member to a vehicle-mounted member such as a hitch-mounting stem, for providing movement of the equipment carrier between operative and non-use positions.

The present invention is a universal mounting bracket for an equipment carrier such as a bicycle rack, that enables both upright and horizontal support members to be movably attached to and utilized with the bracket. The bracket includes a pair of spaced apart generally vertical walls, and either an upright or horizontal support member is adapted to be received within the space between the walls. In one form, the walls are defined by a pair of generally vertical spaced apart upstanding members which are interconnected with and extend upwardly from a bottom member, which in turn is adapted to be secured to a hitch-mounting stem or other hitch-mounting member for securing the bicycle rack to the hitch of a vehicle. The upstanding members define several sets of aligned openings, including a set of aligned primary pivot openings and at least two sets of auxiliary openings spaced from the pivot openings and from each other. Each rack support member includes a pair of spaced apart transverse passages, including an inner passage and an outer passage. Each transverse passage may be defined by a transverse bushing secured to the rack support member, which may be in the form of a tubular member. The bracket walls include stop structure located adjacent each auxiliary opening. In one form, the stop structure consists of an inwardly deformed area of each bracket wall, which is configured and arranged to define an outer edge of each auxiliary opening. At least the outer bushing of each rack support member has outer ends that extend outwardly from the outer surface of the rack support member. The outer ends of the outer bushing are adapted to engage the inwardly deformed areas of the bracket walls, to control the range of movement of the rack support member.

For a suspension-type rack, the upright support member is positioned between the spaced apart walls of the bracket such that the inner passage in the support member, which is defined by an inner transverse bushing, is aligned with the pivot openings in the spaced apart walls. A pivot member, such as a pivot pin, is engaged within the pivot openings and extends through the inner transverse passage in the upright support member. The pivot pin defines a pivot axis about which the upright support member is pivotable for moving the rack between its operative and non-use positions. The outer passage in the upright support member, which is defined by an outer transverse bushing, is positioned between a lower set of aligned auxiliary openings in the bracket walls located below the pivot openings, preferably by engagement of the ends of the outer transverse bushing with the stop structure of the bracket walls adjacent the lower set of aligned auxiliary openings. A releasable engagement member, such as a releasable locking pin, is engaged within the lower set of aligned auxiliary openings and the outer passage in the support member, for maintaining the support member in an upright position which is operable to place the rack in its operative position. The upper set of aligned auxiliary openings in the bracket walls are spaced horizontally from the pivot openings, and are unused when the support member is in its upright position. To place the rack in its non-use position, the user disengages the locking pin from the outer passage in the support member, to enable pivoting movement of the support member about the pivot pin away from its upright position. The support member can then be pivoted downwardly away from the vehicle to a position in which the ends of the outer transverse bushing engage the stop structure of the bracket walls adjacent the upper set of aligned auxiliary openings. This functions to place the rack in its non-use position, in which the rack is positioned so as not to obstruct movement of the vehicle tailgate between its closed and opening positions. The locking pin can be inserted through the upper set of aligned auxiliary openings and the outer transverse bushing, to secure the rack in its non-use position.

For a tray-type rack, the horizontal support member is formed with inner and outer passages and is adapted to be positioned between the spaced apart upstanding walls of the bracket. Again, the support member may be in the form of a tubular member, and the inner and outer passages may be defined by respective inner and outer transverse bushings secured to the walls of the support member. The inner passage is located between and aligned with the pivot openings in the upstanding members of the bracket. A pivot pin is engaged within the pivot openings and the inner passage of the support member, and defines a pivot axis about which the support member is pivotable between horizontal and upright positions. The outer passage defined by the outer bushing is located between the upper set of auxiliary openings, and the ends of the outer bracket are engaged with the stop structure of the bracket walls adjacent the upper set of auxiliary openings, to place the support member in a generally horizontal position. A locking pin is releasably engaged within the upper set of auxiliary openings and extends through the passage defined by the outer bushing. In this manner, the locking pin and stop structure function to maintain the support member in its horizontal position, in which the rack is in its operative position. The locking pin can be removed from engagement within the passage defined by the outer bushing, and the support member can then be pivoted about the pivot axis defined by the pivot pin to an upright position, which places the rack in its non-use position. The ends of the outer bushing engage the stop structure adjacent the lower set of auxiliary openings, such that the passage defined by the outer bushing is placed into alignment with the lower set of auxiliary openings. The locking pin is then engaged within the lower set of auxiliary openings and extends through the passage defined by the outer bushing, for releasably maintaining the support member in its upright position.

With this arrangement, the universal bracket of the present invention is adapted to mount either a suspension-type or tray-type rack to a vehicle, and to provide movement of the rack between operative and non-use positions. In either configuration, the rack support member is pivotably mounted to the bracket, and is releasably retained in a first position in which the rack is in its operative position, and can then be moved to a second position and engaged with the bracket so as to place the rack in its non-use position.

The invention contemplates a bracket arrangement for use with an equipment carrier or rack, as well as a method of mounting an equipment carrier or rack to a vehicle mounting member, substantially in accordance with the foregoing summary.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 6 is a partial cross-sectional view along line 6—6 of FIG. 3 and line 6—6 of FIG. 9;

FIG. 7 is a partial cross-sectional view along line 7—7 of FIG. 4 and line 7—7 of FIG. 8;

FIG. 8 is a side elevation view of an equipment carrier, in the form of a bicycle rack, which includes a horizontal support member and which is pivotably attached to a vehicle utilizing the universal mounting bracket of the present invention, showing the carrier in an operative use position; and FIG. 9 is a side elevation view similar to FIG. 8, showing the horizontal support member pivoted relative to the mounting bracket so as to place the carrier in an inoperative non-use position.

DETAILED DESCRIPTION OF THE INVENTION

Figure 1:
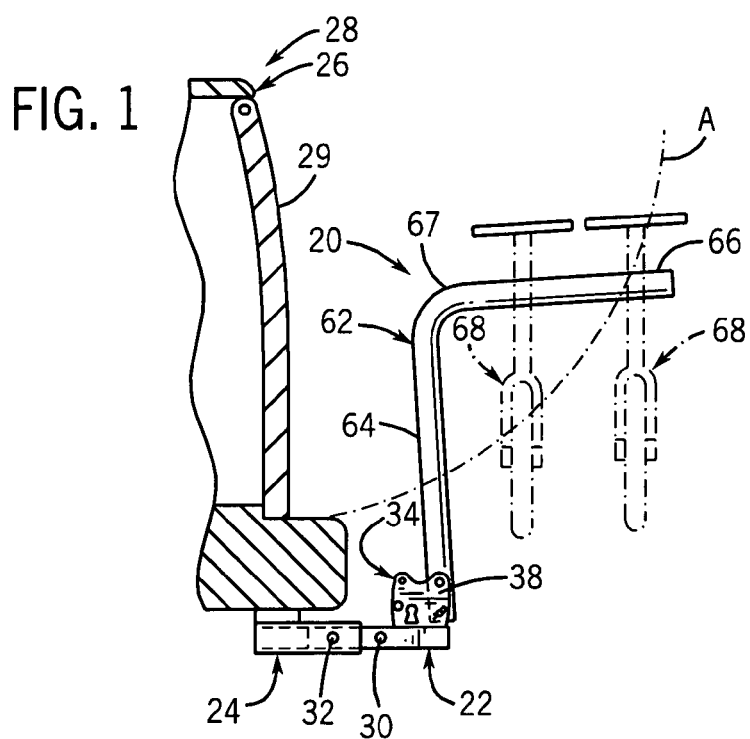
FIG. 1 is a side elevation view of an equipment carrier, in the form of a bicycle rack, which includes an upright support member and which is pivotably attached to a vehicle utilizing the universal mounting bracket of the present invention, showing the carrier in an operative use position.

Referring to the following description in which like reference numerals represent like parts throughout the disclosure, a vehicle-mounted equipment carrier in the form of a suspension-type bicycle rack is indicated generally at 20 in FIG. 1. Rack 20 includes a hitch-mounting stem or hitch-mounting member 22 releasably mounted within a conventional hitch receiver 24 secured to a rear end 26 of a vehicle 28 having an outwardly movable rear door 29. Hitch-mounting member 22 is adapted to be secured to hitch receiver 24 in any conventional manner, such as by means of one or more spaced openings 30 that are selectively alignable with a pair of openings 32 extending through opposite sides of the hitch receiver 24. Hitch-mounting member 22 is formed from a generally rigid material, such as a metal, and has a cross-section slightly smaller than, but complementary to the cross-section of a passage defined by hitch receiver 24. When hitch-mounting member 22 is inserted into the passage of hitch receiver 24, one of the hitch-mounting member openings 30 is aligned with the hitch receiver openings 32, and a locking member is inserted through the respective openings to releasably fix hitch-mounting member 22 to hitch receiver 24, and thereby to vehicle 28. Representatively, the locking member may be in the form of a threaded bolt that is engageable with a threaded member associated with hitch-mounting member 22, although it is understood that any other type of releasable engagement arrangement may be employed.

Referring to FIGS. 3–7, hitch-mounting member 22 supports a universal mounting bracket 34 constructed in accordance with the present invention, at its outer end opposite hitch receiver 24. Mounting bracket 34 is formed from a single or multiple pieces of a rigid material, preferably a metal such as steel, iron or aluminum. Mounting bracket 34 includes a bottom member or wall 36 that is fixed to the hitch-mounting member 22, and a pair of upstanding members or walls 38 and 40 that extend upwardly from the opposite sides of bottom wall 36. An open interior space 41 is defined between upstanding members 38 and 40. Each upstanding member 38 and 40 can be integrally formed with the bottom member 36, or can be a separate member fixedly secured to bottom member 36, such as by welding or any other suitable means. Upstanding members 38 and 40 are formed similarly to one another and have a front edge 42, a rear edge 44 and a top edge 46 opposite the bottom member 36 extending between the front edge 42 and rear edge 44. Upstanding members 38 and 40 are generally rectangular in shape, but can have any suitable configuration.

Upstanding members 38 and 40 each include a pivot opening 48 disposed adjacent the front edge 42 and top edge 46, an upper auxiliary opening 50 disposed adjacent the rear edge 44 and top edge 46, and a lower auxiliary opening 52 disposed adjacent the front edge 42 and bottom member 36. Openings 48, 50 and 52 in upstanding members 38 and 40 are in alignment with each other. Upper auxiliary opening 50 is located generally horizontally rearwardly of pivot opening 48, and lower auxiliary opening 52 is located generally vertically below pivot opening 48.

Upstanding members 38 and 40 of bracket 34 are formed with indented stop structure adjacent each of auxiliary openings 50 and 52. The indented stop structure adjacent upper auxiliary opening 50 is in the form of an inwardly bent or deformed stop area 54, located above the upper edge of upper auxiliary opening 50, which is bent inwardly relative to the remainder of its associated upstanding wall 38 and 40 so as to be laterally offset inwardly from the inner surface of the upstanding wall 38 or 40. Stop area 54 is configured to define a downwardly facing stop edge which forms the upper edge of upper auxiliary opening 50. In a similar manner, the stop structure adjacent each lower auxiliary opening 52 is in the form of an inwardly bent or deformed stop area, shown at 56, of the associated upstanding wall 38 or 40, located forwardly of lower auxiliary opening 52. Stop area 56 is configured to define a rearwardly facing stop edge which forms the forward edge of lower auxiliary opening 52, and which is disposed inwardly of the inner surface of the remainder of the associated upstanding wall 38, 40.

Upstanding walls 38, 40 are also formed with aligned locking apertures 58, which are adapted to receive a locking cable for locking bicycles to rack 20. Each aperture 58 is formed with a key hole shape, to provide a visual indication to the user as to the intended function of aperture 58 and the location at which the locking cable is to be engaged with bracket 34.

Interior space 41 between the upstanding members 38 and 40 receives a generally upright support member 62 associated with rack 20. While the support member 62 is shown as having a circular or tubular cross-section, it is understood that support member 62 may have any configuration capable of being received within the interior space 41 of the bracket 34. As shown in FIGS. 1–7, support member 62 is generally an inverted L-shaped, tubular member having a lower upright or vertical section 64 and an upper rearwardly-extending or horizontal section 66 joined by a curved section 67. One or more bicycles 68 or other equipment such as skis, snowboards, etc. are adapted to be secured to horizontal section 66 in any satisfactory manner. Representatively, bicycle 68 may be secured to horizontal section 66 using a support arrangement such as is disclosed in copending application Ser. No. 09/668,437 filed Sep. 22, 2000, the disclosure of which is hereby incorporated by reference, or by means of supports such as are disclosed in Bloemer et al U.S. Pat. No. 5,938,093, which is also hereby incorporated by reference. Any other type of satisfactory securing arrangement may also be employed, in a manner as is known. Bicycles 68 are secured to horizontal section 66 so as to be suspended therefrom, typically by engagement with the bicycle frame or an upper area of one or more of the bicycle wheels. In the case of skis, snowboards or the like, a basket-type structure may be secured to upright or vertical section 64 for receiving the lower ends of the skis or snowboards, which are then engaged with horizontal section 66 via straps or any other satisfactory engagement arrangement. Alternatively, skis may be supported in a transverse orientation on horizontal section 66 in a manner as is known.

Opposite curved section 67, vertical section 64 of support member 62 includes a lower or outer transverse passage defined by a transverse bushing 70 that extends through aligned openings formed in the lower end of support member 62. Bushing 70 is secured to support member 62 in any satisfactory manner, such as by welding. The length of bushing 70 is greater than the outside transverse dimension of support member 62, such that each end of bushing 70 extends outwardly past the outer surface of support member 62. Vertical section 64 further includes an upper or inner transverse passage defined by a transverse bushing 72 that extends through aligned openings formed in the lower end of support member 62. Bushing 72 is secured to support member in any satisfactory manner, such as by welding. The length of bushing 72 is greater than the outside transverse dimension of support member 62, such that each end of bushing 72 extends outwardly past the outer surface of support member 62. Bushings 70 and 72 have a length slightly less than the space between the facing inside surfaces of upstanding walls 38 and 40. When vertical section 64 is positioned within interior space 41 of bracket 34, the passage defined by bushing 72 is aligned with the pivot openings 48 in each upstanding member 38 and 40. A pivot pin 74 is engaged within pivot openings 48 in upstanding members 38 and 40, and extends through the passage defined by pivot bushing 72. Pivot pin 74 includes a shank that extends from a head 76 at one end and which has a threaded end 78 opposite head 76. When threaded end 76 of pivot pin 74 is inserted completely through the pivot openings 48 and the transverse passage of bushing 72, threaded end 78 is releasably engaged by a nut 80 to retain pivot pin 74 between the upstanding members 38 and 40. Pivot pin 74 thus functions to pivotably mount vertical section 64 to and between upstanding members 38 and 40, such that support member 62 is pivotable relative to bracket 34 for movement about a transverse pivot axis defined by pivot pin 74.

Figure 2:
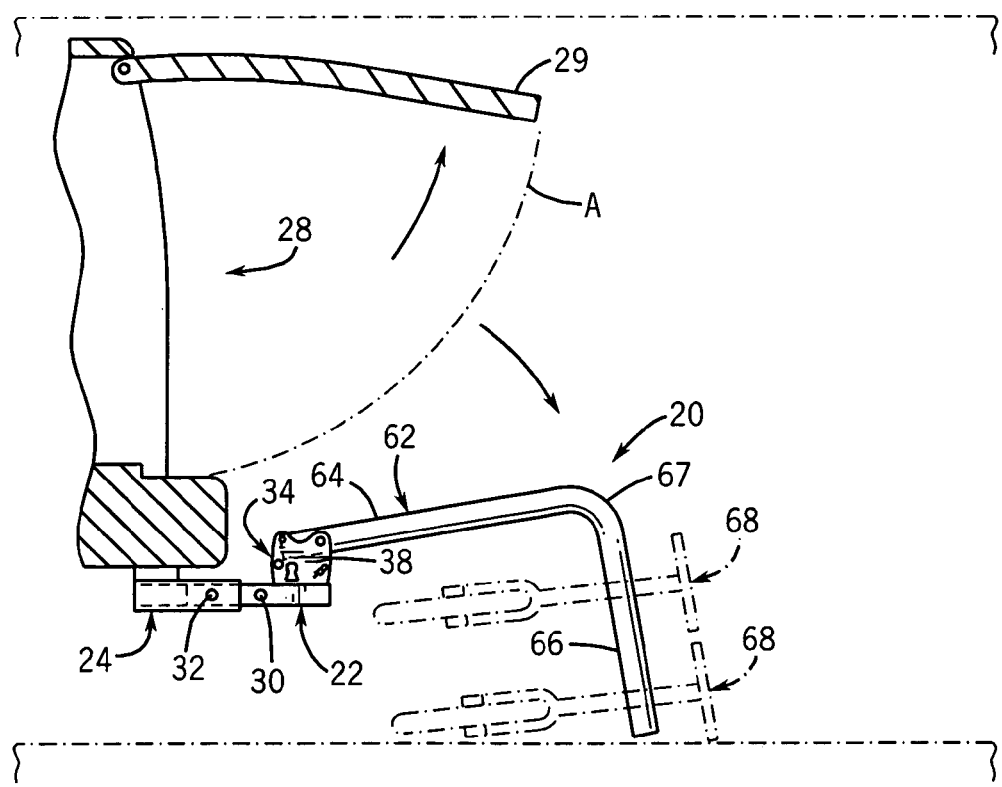
FIG. 2 is a side elevation view similar to FIG. 1 showing the upright support member pivoted relative to the mounting bracket so as to place the carrier in an inoperative non-use position.
Figure 3:
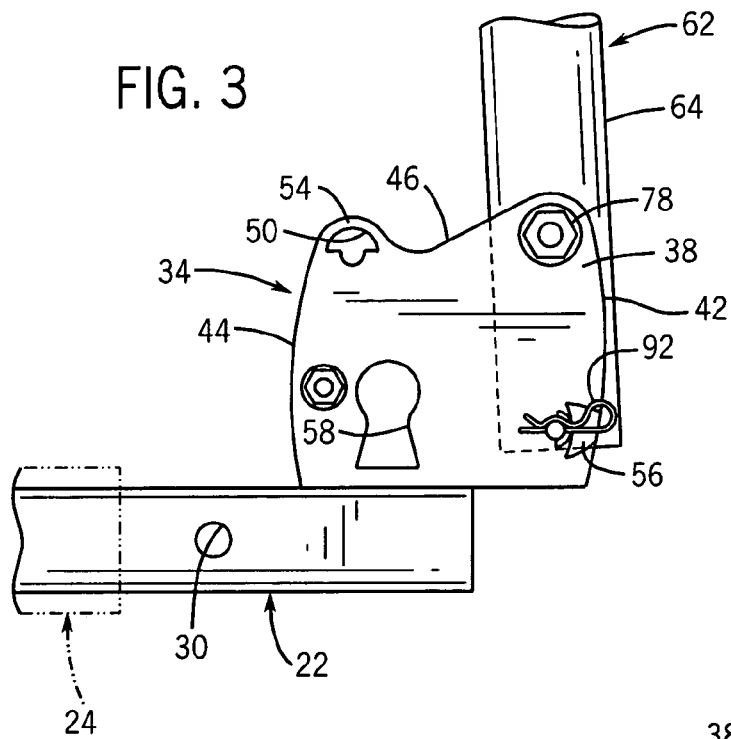
FIG. 3 is an enlarged partial side elevation view showing the universal mounting bracket and the lower end of the support member of the equipment carrier, with the equipment carrier in the operative position of FIG. 1.
Figure 5:
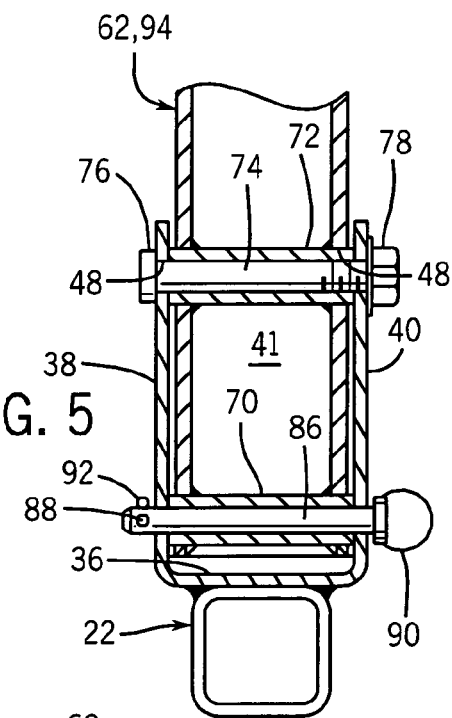
FIG. 5 is a partial cross-sectional view along line 5—5 of FIG. 3 and line 5—5 of FIG. 9.
Figure 4:
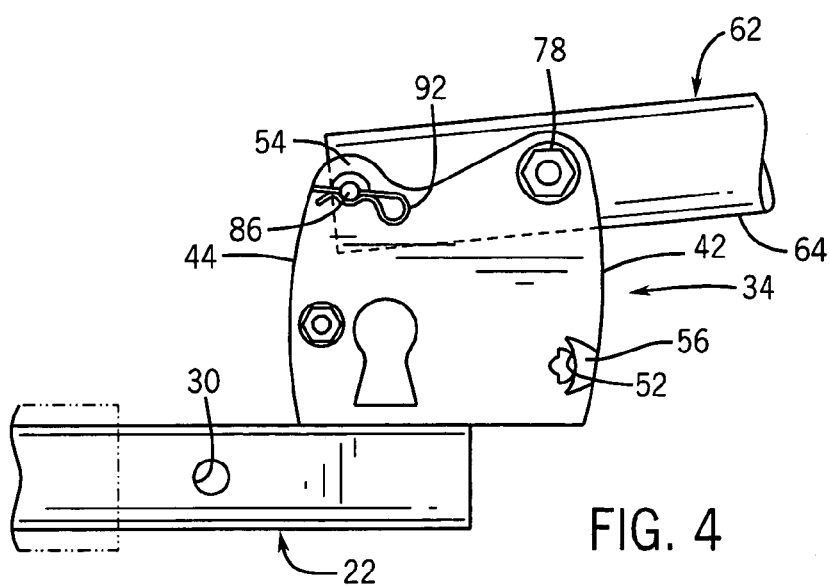
FIG. 4 is a view similar to FIG. 3, showing the universal mounting bracket and the lower end of the support member of the equipment carrier, with the equipment carrier in the non-use position of FIG. 2.

Support member 62 is pivotable about pivot pin 74 so as to enable movement of carrier 20 between an operative, upright transport or use position shown in FIGS. 1 and 3, an inoperative, lowered non-use position shown in FIGS. 2 and 4. When support member 62 is in the non-use position of FIGS. 2 and 4, the pivotable door 29 on the rear end 26 of vehicle 28 can swing outwardly along an arc A (FIGS. 1 and 2) such that an individual can access the interior of the vehicle 28. Alternatively, the vehicle door 29 may have a side hinge construction so as to move in a horizontal path between its open and closed positions. In either event, movement of support member 62 to its non-use position enables the vehicle door 29 to be freely moved between its open and closed positions without interference from the components of rack 20.

When support member 62 is in its upright position of FIGS. 1 and 3, the ends of bushing 70 engage the edge of indented stop areas 56 in upstanding walls 38, 40, to locate bushing 72 in a position in which the passage of bushing 72 is in alignment with lower auxiliary openings 52 in upstanding members 38, 40. When support member 62 is in its upright operative position of FIGS. 1 and 3, support member 62 is locked in position by inserting a locking pin 86 through the lower auxiliary openings 52 in upstanding members 38 and 40, and through the passage defined by bushing 70, which is aligned with the lower auxiliary openings 52. In this manner, support member 62 is positioned and retained generally vertically with respect to bracket 34. Locking pin 86 may include a transverse opening 88 at one end and a finger ring 90 at the other end. Ring 90 can be grasped and used to insert locking pin 86 within, and to withdraw locking pin 86 from, the respective openings. In addition, ring 90 may be attached to one end of a cord or lanyard that is secured to one of the upstanding members, such as 40, to maintain locking pin 86 in engagement with bracket 34. Transverse opening 88 opposite ring 90 receives a securing member, such as a cotter pin 92, in order to maintain locking pin 86 in engagement within lower auxiliary openings 52 in upstanding members 38 and 40. In this manner, the bracket 34 functions to maintain support member 62 in the upright operative position until the locking pin 86 is removed.

In order to move carrier 20 to its lowered inoperative position of FIGS. 2 and 4, locking pin 86 is removed from lower auxiliary openings 52 and the passage of bushing 70, which enables support member 62 to be pivoted about pivot pin 74 in a clockwise direction so as to move support member 62 downwardly. The ends of bushing 70 are moved into contact with the inwardly deformed stop areas 54 of upstanding members 38 and 40, which functions to prevent further movement of support member 62 when support member 62 is pivoted away from its operative position of FIGS. 1 and 3, to limit the pivoting movement of support member 62 to its inoperative or non-use position as shown in FIGS. 2 and 4. Engagement of the ends of bushing 70 with the edges of stop areas 54 functions to bring the passage of bushing 70 into alignment with upper auxiliary openings 50. If desired, locking pin 86 can be inserted through upper auxiliary openings 50 and the passage of bushing 70 to maintain support member 62 in its lowered inoperative position. When it is subsequently desired to return carrier 20 to its upright operative position, locking pin 86 is removed and support member 62 is pivoted about pivot pin 72 to its upright position as described previously, and locking pin 86 is then inserted through lower auxiliary openings 52 and the passage of bushing 70 to maintain support member 62 in its upright operative position.

Referring now to FIGS. 8 and 9, bracket 34 is shown in combination with a vehicle-mounted tray-type equipment carrier that provides equipment support from below. In the specific illustrated embodiment, the equipment carrier is in the form of a bicycle rack 93 that is adapted to support one or more bicycles rearwardly of the vehicle. Bicycle rack 93 includes a generally horizontal support member 94 that extends in a forward-rearward direction, and which is interconnected with and extends from bracket 34. Support member 94 is in the form of a tube formed of a rigid material that can be any suitable shape, e.g. generally rectangular, circular or D-shaped in cross-section, which supports one or more bicycle wheel-engaging or bicycle fork-mounting members, schematically shown at 96. Representatively, support member 94 may be utilized to mount a tray-type rack such as is disclosed in copending application Ser. No. 09/624,546 filed Jul. 24, 2000, the disclosure of which is hereby incorporated by reference, or such as is disclosed in copending application Ser. No. 60/314,428 filed Aug. 23, 2001, the disclosure of which is also hereby incorporated by reference. Alternatively, it is understood that any other type of arrangement may be employed for engaging the bicycle wheels, such as shown at 97, or the fork of a bicycle for providing support for the bicycle from below.

Support member 94 includes an inner or proximal end 98 that is positioned within the interior space 41 of bracket 34, and a distal end 100 located outwardly or rearwardly of bracket 34. Support member 94 further includes an outer transverse passage defined by a bushing, in the same manner as outer bushing 70 of support member 62, adjacent the proximal end 98. Similarly, support member 94 includes an inner transverse passage defined by a bushing in the same manner as pivot bushing 72 of support member 62. Support member 94 is pivotably mounted to and between upstanding members 38 and 40 of bracket 34 by means of pivot pin 74 that extends through the support member pivot bushing 72 and the aligned pivot openings 48 in upstanding members 38 and 40. Support member 94 is pivotably mounted to bracket 34 for movement between operative and non-use positions about a transverse pivot axis defined by pivot pin 74, in a manner similar to that of support member 62 as discussed previously. To maintain support member 94 in the operative transport position shown in FIG. 8, locking pin 86 is inserted through the upper auxiliary openings 50 and through the passage defined by bushing 70 aligned locking openings in the walls of support member 94. The securing member, such as cotter pin 92, is then engaged with locking pin 86 through transverse opening 88, to maintain locking pin 94 in engagement with support member 94 and upstanding walls 38 and 40.

To place support member 94 in its inoperative or non-use position, as shown in FIG. 9, cotter pin 92 is removed from locking pin 86 and locking pin 86 is then withdrawn. This allows support member 94 to be pivoted upwardly in a counterclockwise direction indicated by arrow B in FIG. 9, to a position in which the passage defined by bushing 70 is aligned with the lower auxiliary openings 52. When the respective openings are aligned with one another, locking pin 86 is then reinserted through the support member locking openings and lower auxiliary openings 52, and secured therein by the securing member 60. This functions to place support member 94 in an upright vertical non-use position, typically for transport when rack 93 is not being used to transport bicycles.

In the same manner as described with respect to support member 62, the ends of outer bushing 70 engage the edges of stop areas 54 to locate support member 94 in its lowered operative position and to align the passage in outer bushing 70 with upper auxiliary openings 50. Similarly, the outer ends of bushing 70 engage the edges of stop areas 56, to place support member 94 in its upright inoperative position and to align the passage of bushing 70 with lower auxiliary openings 52.

It can thus be appreciated that universal mounting bracket 34 enables mounting of two differently configured types of equipment carriers to hitch-mounting member 22, and provides the capability for moving each type of carrier between an operative or use position and an inoperative or non-use position. Mounting bracket 34 further provides the capability to retain each type of carrier in both its operative and non-use positions. Mounting bracket 34 may be incorporated into the assembly of either an upright or tray-type carrier, and may be utilized as original equipment or in a retrofit or modular carrier arrangement. In order to provide manufacturing efficiencies, universal mounting bracket 34 can be incorporated in either type of carrier during original manufacture, which can thus provide lower production costs than when separate specially designed mounting brackets are provided for either type of carrier. In a modular application, hitch-mounting member 22 and universal mounting bracket 34 are provided as a base, and either type of carrier can be purchased and assembled together with hitch-mounting member 22 and universal mounting bracket 34 for assembling the desired type of carrier. In a retrofit application, the user can purchase an assembly consisting of hitch-mounting member 22 and universal mounting bracket 34, and can then connect the support member of an existing pivotable carrier to mounting bracket 34 to adapt an existing carrier for use with other types of carriers. In addition, the user can purchase one type of carrier incorporating universal mounting bracket 34, and can then purchase components for another type of carrier and assemble such components to universal mounting bracket 34 in order to provide a different type of carrier.

While the universal mounting bracket 34 has been shown and described with respect to a preferred embodiment, numerous variations and alternative configurations are contemplated by the present invention and are covered by the claims of this application. For example, and without limitation, the locking pin 86 could be replaced by another suitable selectively engageable locking mechanism, such as one or more spring-biased locking clips positioned on the bracket 34 that releasably engage the support member 62 or 94 in the storage and transport positions. The bracket 34 can also have a top wall (not shown) extending between the upright members 38 and 40 that can function as the stop for the support member 62 or 94. The bottom wall 36 can also be omitted such that each of the upstanding members 38 and 40 is secured directly to mounting stem 22. Alternatively, upstanding walls 38 and 40 of universal mounting bracket 34 may be replaced with any other type of structure defining a space within which either support member 62 or 94 may be received, and which incorporates provisions for the pivot pin, locking member and/or stop member. In addition, while the stop structure associated with upstanding members 38 and 40 has been shown and described as inwardly deformed stop areas which define edges that engage ends of bushings to limit pivoting movement of the support member, it is also contemplated that other types of stop arrangements may be used to limit pivoting movement of the support member. For example, transverse stop pins may be engaged with and extend between upstanding members 38, 40, to engage the support member and to limit pivoting movement of the support member between its operative use position and inoperative non-use position.

It is also understood that the stop arrangement associated with bracket 34 may be used in connection with any type of carrier, such as a trunk-mounted carrier to limit movement of any component associated with the carrier, and is not limited to use in connection with a hitch-mounted rack as shown and described.

In addition, while mounting bracket 34 has been shown and described with respect to equipment carriers such as bicycle racks, it is understood that mounting bracket 34 may be used in combination with any type of equipment carrier which has either an upright support member or a rearwardly extending support member, such as luggage carriers, motorcycle racks, etc. Further, while universal mounting bracket 34 has been shown and described in connection with a hitch-mounted carrier, it is understood the mounting bracket 34 may be used in combination with any type of vehicle engagement arrangement, including a front or rear bumper mounting arrangement, a trunk mount arrangement, etc.

Various alternatives and embodiments are contemplated as being within the scope of the following claims particularly pointing out and distinctly claiming the subject matter regarded as the invention.

We claim:

1. An equipment carrier arrangement for mounting to a vehicle, comprising:
   a base member;
   a pair of spaced apart members interconnected with the base member;
   a support member configured to support one or more items of equipment;
   a pivot arrangement interconnected between the spaced apart members and the support member, wherein the pivot arrangement is operable to pivotably mount the support member for movement between an operative position and a non-use position; and
   a variable position engagement arrangement associated with the pair of spaced apart members, wherein the variable position engagement arrangement includes first engagement structure located below the pivot arrangement and second engagement structure located rearwardly of the pivot arrangement;
   wherein the first engagement structure is configured to engage the support member to maintain the support member in one of the operative or non-use positions, and is disengageable from the support member to enable the support member to pivot away from the first engagement structure via the pivot arrangement toward the second engagement structure to the other of the operative or non-use positions, and wherein the second engagement structure is configured to engage the support member to maintain the position of the support member, and is disengageable from the support member to enable the support member to pivot away from the second engagement structure via the pivot arrangement to the operative or non-use position in which the support member is engaged with the first engagement structure.

2. The equipment carrier arrangement of claim 1 wherein the base member is a hitch-mounting member adapted for releasable engagement with a vehicle hitch member.

3. The equipment carrier arrangement of claim 1 wherein the pair of spaced apart members comprises first and second upstanding members extending from a bottom member.

4. The equipment carrier arrangement of claim 3 wherein the pivot arrangement comprises a pivot pin and the first and second upstanding members include aligned pivot openings within which the pivot pin is adapted to be received.

5. The equipment carrier arrangement of claim 4 wherein the pivot pin is adapted to extend through passage structure associated with the first and second upstanding members.

6. The equipment carrier arrangement of claim 1 wherein each of the first and second engagement structures includes a stop arrangement associated with the spaced apart members, wherein the stop arrangement is adapted to limit pivoting movement of the support member with respect to the equipment carrier arrangement.

7. The equipment carrier arrangement of claim 1 wherein the variable position engagement arrangement comprises an elongate engagement member extending between the pair of spaced apart members, and wherein the elongate engagement member is adapted to extend through passage structure associated with the support member for selectively maintaining the support member in the operative position and in the non-use position.

8. The equipment carrier arrangement of claim 7 wherein the variable position engagement arrangement further includes a releasable securing mechanism adapted for selective engagement with the elongate engagement member for selectively preventing disengagement of the engagement member from the pair of spaced apart members.

9. The equipment carrier arrangement of claim 7 wherein the elongate member is attached to one of the spaced apart members.

10. The equipment carrier arrangement of claim 1, wherein the equipment carrier arrangement comprises a rack for one or more bicycles.

11. A mounting bracket for an equipment carrier having a support member, comprising:
a base member;
a pair of spaced apart members interconnected with the base member,
a pivot arrangement extending between the spaced apart members and adapted to pivotally secure an equipment carrier support member to the bracket;
a variable position engagement arrangement associated with the bracket, wherein the variable position engagement arrangement is selectively engageable with an upstanding first support member of an equipment carrier having a first configuration so as to selectively maintain the first support member in a first operative position, and is disengageable from the first support member to enable the first support member to pivot via the pivot arrangement to a first non-use position, and wherein the variable position engagement arrangement is selectively engageable with a rearwardly extending second support member of an equipment carrier having a second configuration different than the first configuration so as to selectively maintain the second support member in a second operative position, and is disengageable from the second support member to enable the second support member to pivot via the pivot arrangement to a second non-use position; and
a stop arrangement associated with the spaced apart members, wherein the stop arrangement is adapted to limit pivoting movement of the first support member with respect to the bracket, wherein the stop arrangement comprises inwardly deformed areas of the spaced apart members, which are configured to engage end portions of a transverse bushing interconnected with and extending outwardly from either the first or the second support member.

12. The mounting bracket of claim 11 wherein the bushing defines a transverse passage adapted to receive a locking member for releasably securing the first or the second support member in the operative and non-use positions.

13. An equipment carrier, comprising:
a vehicle mounting member adapted for engagement with a vehicle;
a mounting bracket interconnected with the vehicle mounting member, wherein the mounting bracket includes a pair of spaced apart members;
a pivot arrangement interconnected between the pair of spaced apart members and adapted to pivotably mount a support member associated with the equipment carrier between the pair of spaced apart members, wherein the support member is pivotable about a pivot axis defined by the pivot arrangement between a first position and a second position;
a first set of aligned openings in the pair of spaced apart members, and a first stop structure defined by at least one of the spaced apart members adjacent at least one of the aligned openings, wherein the first set of aligned openings are laterally spaced from the pivot axis;
a second set of aligned openings in the pair of spaced apart members, and a second stop structure defined by at least one of the spaced apart members adjacent at least one of the aligned openings, wherein tie second set of aligned openings are vertically spaced from the pivot axis;
a releasable engagement member engageable with the spaced apart members of the bracket through the first and second sets of aligned openings and with the support member for selectively maintaining the support member in its first and second positions, wherein the engagement member is disengageable from the support member to enable the support member to be pivoted via the pivot arrangement between the first and second positions, and wherein the first and second stop structures are configured to engage the support member to position the support member in the first and second positions.

14. The equipment carrier of claim 13 wherein the support member comprises an upstanding support member associated with a bicycle rack.

15. The equipment carrier of claim 13 wherein the support member comprises a horizontally extending support member associated with a bicycle rack.

16. The equipment carrier of claim 13 wherein the mounting bracket further includes a base member extending between the pair of spaced apart members and attached to the vehicle mounting member.

17. The equipment carrier of claim 16 wherein the base member is integrally formed with the pair of spaced apart members.

18. The equipment carrier of claim 13 wherein the pivot arrangement comprises an elongate pin extending between the pair of spaced apart members and adapted to extend through passage structure associated with support members.

19. The equipment carrier of claim 13 wherein the engagement member comprises an elongate pin that extends between the spaced apart members and is adapted to extend through passage structure associated with support member.

20. The equipment carrier of claim 19 further comprising a securing member releasably engageable with the elongate pin to maintain the elongate pin in engagement with the spaced apart members and with the support member.

21. A method of assembling an equipment carrier, comprising the steps of:
provided a mounting bracket adapted to be engaged with a vehicle;
providing an upright first support member associated with an equipment carrier having a first configuration;
providing a laterally extending second support member associated with an equipment carrier having a second configuration different than the first configuration; and
selectively mounting one of the first and second support members to the mounting bracket;
wherein the step of mounting the first and second support members to the mounting bracket is carried out by pivotably mounting the support member to a pivot arrangement associated with the mounting bracket;
wherein the step of mounting the first support member to the mounting bracket further includes the step of releasably maintaining the first support member in an operative position by engaging the first support member with a first area of the mounting bracket spaced from the pivot arrangement, wherein the first support member is selectively disengageable from the first area of the mounting bracket for providing pivoting movement of the first support member away from its operative position to a non-use position via the pivot arrangement, and further including the step of selectively maintaining the first support member in its non-use position by engagement with stop structure associated with a second area of the mounting bracket spaced from the pivot arrangement and from the first area of the mounting bracket; and
wherein the step of mounting the second support member to the mounting bracket further includes the step of releasably maintaining the second support member in a second operative position different than the first operative position of the first mounting member by engaging the second support member with the second area of the mounting bracket, wherein the second support member is selectively disengageable from the second area of the mounting bracket for providing pivoting movement of the second support member away from its operative position to a non-use position via the pivot arrangement, and further including the step of selectively maintaining the second support member in its non-use position by releasably engaging the second support member with the first area of the mounting bracket.

22. A vehicle-mounted equipment carrier, comprising:
a mounting member adapted to be secured to the vehicle;
an equipment carrier adapted to support one or more items of equipment, wherein the equipment carrier includes a support member; and
a mounting bracket interposed between the mounting member and the support member, wherein the mounting bracket and the support member include a pivot connection that provides pivoting movement of the support member between an operative position and an inoperative position, wherein the mounting bracket defines a pair of spaced apart walls between which the support member is located, and wherein the spaced apart walls include aligned pairs of spaced apart first and second inwardly extending stop surfaces that are engageable with the support member and which defines a range of pivoting movement of the support member between its operative and inoperative positions; and
a retainer arrangement separate from the stop surfaces that is engageable with the mounting bracket walls and with the support member of the equipment carrier for selectively maintaining the support member in the operative and inoperative positions.

23. The equipment carrier of claim 22, wherein the stop surfaces comprise inwardly deformed areas of the spaced apart walls of the mounting bracket.

24. The equipment carrier of claim 23, wherein each of the inwardly deformed areas of the spaced apart wall is located adjacent an opening formed in the associated one of the spaced apart walls, and wherein the retainer arrangement comprises a retainer member adapted to extend through the openings and through a passage defined by the support member for selectively retaining the support member in either its operative or inoperative position.

25. A vehicle-mounted equipment carrier, comprising:
a mounting member adapted to be secured to the vehicle;
an equipment carrier adapted to support one or more items of equipment, wherein the equipment carrier includes a support member; and
a mounting bracket interposed between the mounting member and the support member, wherein the mounting bracket and the support member include a pivot connection that provides pivoting movement of the support member between an operative position and an inoperative position, wherein the mounting bracket and the support member include stop structure which defines a range of pivoting movement of the support member between its operative and inoperative positions;
wherein the mounting bracket defines a pair of spaced apart surfaces and wherein the support member includes a tubular member defining a transverse passage, wherein end portions of the tubular member extend outwardly from outer surfaces defined by the support member, and wherein the stop structure interacts with the ends of the tubular member for limiting movement of the support member relative to the mounting bracket.

26. The equipment carrier of claim 25, wherein the spaced apart surfaces of the mounting bracket are defined by a pair of spaced apart walls between which the tubular member is located, and wherein the stop structure comprises inwardly deformed areas of the spaced apart walls.

27. The equipment carrier of claim 26, wherein the inwardly deformed areas of the spaced apart walls comprise a pair of inwardly deformed areas, each of which is located adjacent an opening formed in the associated one of the spaced apart walls, wherein the passage defined by the transverse tubular member is in alignment with a first set of openings when the support member is in its operative position and is in alignment with a second set of openings in the spaced apart walls when the support member is in its inoperative position.

28. The equipment carrier of claim 27, further comprising a locking member adapted to extend through the openings and through the passage defined by the tubular member for selectively retaining the support member in either its operative or inoperative position.

* * * * *

UNITED STATES PATENT AND TRADEMARK OFFICE
CERTIFICATE OF CORRECTION

PATENT NO. : 6,929,163 B1
DATED : August 16, 2005
INVENTOR(S) : Fabio Pedrini et al.

It is certified that error appears in the above-identified patent and that said Letters Patent is hereby corrected as shown below:

Column 12,
Line 44, delete "tie" and substitute therefore -- the --.

Signed and Sealed this

Eleventh Day of October, 2005

JON W. DUDAS
*Director of the United States Patent and Trademark Office*